United States Patent
Wen

(10) Patent No.: US 9,945,556 B2
(45) Date of Patent: Apr. 17, 2018

(54) FOSSIL-FUEL POWER GENERATION SYSTEM ASSISTED BY WASTE INCINERATION

(71) Applicant: Xiangyuan Wen, Henan (CN)

(72) Inventor: Xiangyuan Wen, Henan (CN)

( * ) Notice: Subject to any disclaimer, the term of this patent is extended or adjusted under 35 U.S.C. 154(b) by 512 days.

(21) Appl. No.: 14/617,696

(22) Filed: Feb. 9, 2015

(65) Prior Publication Data

US 2015/0267916 A1    Sep. 24, 2015

(30) Foreign Application Priority Data

Mar. 19, 2014 (CN) .................... 2014 2 0122715 U

(51) Int. Cl.
| | |
|---|---|
| F23G 5/44 | (2006.01) |
| F01K 5/02 | (2006.01) |
| F23G 5/46 | (2006.01) |
| F23L 9/02 | (2006.01) |
| F23J 15/02 | (2006.01) |
| F23G 5/00 | (2006.01) |
| F23J 1/02 | (2006.01) |
| F23G 5/20 | (2006.01) |
| F23H 7/04 | (2006.01) |
| F23G 5/50 | (2006.01) |

(52) U.S. Cl.
CPC ............... *F23G 5/444* (2013.01); *F01K 5/02* (2013.01); *F23G 5/002* (2013.01); *F23G 5/46* (2013.01); *F23G 5/50* (2013.01); *F23J 1/02* (2013.01); *F23J 15/02* (2013.01); *F23L 9/02* (2013.01); *F23G 2206/203* (2013.01); *F23G 2207/20* (2013.01); *F23G 2207/30* (2013.01); *F23H 7/04* (2013.01); *Y02E 20/12* (2013.01)

(58) Field of Classification Search
CPC .......... F23G 2206/20; F23G 2206/203; F23G 2900/50001; F23G 2204/10; F23G 2204/101; F23G 2204/103; F23G 2002/102; F23G 5/12
See application file for complete search history.

(56) References Cited

U.S. PATENT DOCUMENTS

| | | | | |
|---|---|---|---|---|
| 4,852,344 A | * | 8/1989 | Warner ................ | F01K 3/247 60/39.182 |
| 8,156,876 B2 | * | 4/2012 | Smith ................... | F02C 3/20 110/186 |

* cited by examiner

*Primary Examiner* — David J Laux

(57) ABSTRACT

A fossil-fuel power generation system assisted by waste incineration includes a waste incineration subsystem and a fossil-fuel power generation subsystem; wherein: the waste incineration subsystem includes a waste incinerator and the fossil-fuel power generation subsystem includes a main boiler; a flue gas channel is provided between a furnace of the waste incinerator and the main boiler; flue gas generated by waste incineration of the waste incinerator enters the main boiler through the flue gas channel; and the flue gas channel is located in a low part of the main boiler. Based on a high-temperature combustion environment of the main boiler, thermal energy of combustible waste is fully released and a thermal efficiency is increased; moreover, the flue gas discharged by the waste incinerator contains harmful substances which are mostly burned down by a high-temperature incineration of the main boiler. A secondary incineration greatly reduces the harmful substances and protects environment.

6 Claims, 2 Drawing Sheets

FOSSIL-FUEL POWER GENERATION SYSTEM ASSISTED BY WASTE INCINERATION

CROSS REFERENCE OF RELATED APPLICATION

The present invention claims priority under 35 U.S.C. 119(a-d) to CN 201420122715.X, filed Mar. 19, 2014.

BACKGROUND OF THE PRESENT INVENTION

Field of Invention

The present invention relates to a field of fossil-fuel power generation technology, and more particularly to a fossil-fuel power generation system assisted by waste incineration.

Description of Related Arts

In recent years, with the acceleration of urbanization process and the improvement of people's lives, municipal solid waste (MSW) in China increases with an average growth rate of nearly 9% per year and per capita annual output reaches 440 kg. Currently, a cumulative amount of waste in China is nearly 7 billion tons, covering an area of more than 500 million square meters; among large and medium cities nearly ⅔ are surrounded by the waste and about ¼ has no suitable place for stockpiling the waste. The conventional waste disposal method in China is mainly the landfill and a disposal capacity of the landfill accounts for more than 90% of a total waste disposal capacity. A sampling result of China's Environment Protection Bureau for 329 various types of MSE disposal facilities in 30 provinces, cities and autonomous regions except Tibet and Taiwan shows: among 288 landfill sites only 16 landfill sites are in full compliance with "Environmental Protection Requirements for MSW Landfill Sites Engineering Design" of Standard for Pollution Control on the Landfill Site of Municipal Solid Waste. Test results of a survey for leachate, groundwater and fugitive emissions of each landfill site show that a chemical oxygen demand and a coliform value of leachate, ammonia and nitrogen of groundwater and ammonia and hydrogen sulfide of fugitive emissions exceed the standard seriously. Thus, the traditional way for a disposal of the household waste and the similar industrial and commercial waste is impossible to be continued, and the capacities of the existing waste collection and distribution sites will soon be saturated; for the environmental protection, a proposition of new large-scale waste collection and distribution sites is unacceptable and the conventional waste disposal methods need a transition to become conducive to ecological protection.

A feasible waste disposal method is to separate out organic materials from the waste for a corruption use, which prevents the accumulation of the harmful osmosis water of the waste collection and distribution sites and reduces the generation of methane. However, in the waste still exists a part of dirt which is unable to corrupt or hardly corrupts, and thus the part of dirt is only sent to the landfill sites for storage or to the waste incineration plants for incineration. A large part of the waste is able to be efficiently recycled by a thermal energy conversion method.

Waste incineration power generation is now one of the ways to solve waste problem by incinerating organic waste to release thermal energy for power generation. However, the Chinese conventional waste incineration power generation technology is still at a low level, which often simply replaces conventional oil, coal and other fossil fuels with the waste and adopts the conventional design of discharging exhaust gas by the incinerating boilers, so that the conventional waste incineration power generation has a low thermal efficiency.

SUMMARY OF THE PRESENT INVENTION

An object of the present invention is to provide a fossil-fuel power generation system assisted by waste incineration for solving the above problems.

Thus, the present invention adopts following technical solutions.

A fossil-fuel power generation system assisted by waste incineration comprises a waste incineration subsystem and a fossil-fuel power generation subsystem; wherein:

the waste incineration subsystem comprises a waste incinerator and the fossil-fuel power generation subsystem comprises a main boiler;

a flue gas channel is provided between a furnace of the waste incinerator and the main boiler; flue gas generated by waste incineration of the waste incinerator enters the main boiler through the flue gas channel; and the flue gas channel is located in a low part of the main boiler.

The flue gas channel is lined with fire-resistant materials.

The waste incineration subsystem further comprises a control device which comprises a switch component for controlling the waste incineration subsystem to enter or withdraw from the fossil-fuel power generation subsystem in real time; and the control device is further for controlling a feeding frequency and a total ventilation amount of the waste incineration subsystem.

The waste incinerator has a pushing-type grate structure, comprising a grate, a holder for the grate, a power device and a grate driving component; wherein:

the grate, located below the furnace, comprises orderly arranged movable grate strips and fixed grate strips, wherein a row of the fixed grate strips and a row of the movable grate strips are staggered successively;

the holder for the grate is located below the grate, for supporting the movable grate strips and the fixed grate strips;

the power device, for supplying hydraulic power for the whole waste incinerator, comprises a hydraulic unit, a reversing valve, a relief valve, a pressure gauge, a pressure switch and an oil tank; and the grate driving component comprises a plurality of driving motors and corresponding connection pipelines.

The waste incinerator further comprises a cooling mechanism which has a peripheral protective sleeve and is mounted on a sidewall of a whole combustion zone of the furnace.

The waste incinerator further comprises two sets of ignition and combustion burners which are symmetrically mounted on two sidewalls of the furnace.

The waste incineration subsystem further comprises a storage chamber, an inputting mechanism and a feeding mechanism.

The storage chamber is for sending combustible waste to the furnace and balancing combustible waste storage.

The inputting mechanism comprises a hopper, a wings flap, a flap box and an inputting channel leading the furnace; wherein:

the hopper has a steel-plate structure and hangs at an outlet of the storage chamber;

the wings flap, for preventing air from entering the furnace of the waste incinerator when the hopper is short of waste, comprises a hollow shaft, a bearing neck, a transmission lever, a radial joint coupler and a hydraulic cylinder;

the flap box contains the wings flap and connects the hopper and the inputting channel; and the inputting channel has an inlet sleeved with the flap box and an outlet connected with the furnace; the inputting channel is further provided with a water injection connection sleeve and a drainage connection sleeve.

The feeding mechanism is a mechanical non-stop feeding mechanism, comprising two pounder-type feeding push-rods with a hydraulic synchronous movement, a connecting rod and a universal joint, a sliding plate and a sealing panel, a feeding rail made of steel plates and section-steel brackets, a beam located above an inlet of the furnace and a coaming with a protective lining.

The inputting mechanism further comprises a compensator which is located between the flap box and the inputting channel.

The waste incinerator further comprises a slag discharging and soot cleaning equipment which comprises an ash hopper, a scraping-rake-type transporter, an ash hopper fastener and a sliding slot; wherein:

the ash hopper for collecting fallen ash is located at the bottom of the grate;

the scraping-rake-type transporter is for cleaning the fallen ash in the ash hopper by wetting;

the ash hopper fastener for closing a discharging outlet of the ash hopper is located below the ash hopper; and the sliding slot connects the ash hopper and the scraping-rake-type transporter.

The present invention provides a fossil-fuel power generation system assisted by waste incineration, which connects the waste incineration system and a conventional fossil-fuel power generation system, wherein the waste incineration system assists the fossil-fuel power generation system. The flue gas after a primary incineration of the combustible waste enters the main boiler of the fossil-fuel power generation system by the flue gas channel for a secondary incineration. The flue gas channel connecting the waste incinerator and the main boiler of a power plant is located below the main boiler, so as to ensure a highest combustion temperature of the entire combustion chamber of the main boiler from beginning to end, wherein the flue gas from the assistant waste incinerator throughout the high-temperature combustion zone is able to be heated to 1400-1500° C. The high-temperature combustion environment fully releases a thermal energy of the combustible waste and increases a thermal efficiency.

Moreover, the flue gas exhausted by the waste incinerator contains many harmful substances, such as cyanogen chloride and furan. Most of the harmful substances are burned down by the high-temperature incineration of the main boiler. Thus, a content of the harmful substances in the exhausted flue gas after the secondary incineration decreases greatly, which is more environmentally friendly.

BRIEF DESCRIPTION OF THE DRAWINGS

The drawings and embodiments have been shown and described for the purposes of illustrating the functional and structural principles of the present invention and are subject to change without departure from such principles. Therefore, the present invention includes all modifications encompassed within the spirit and scope of the following claims.

DETAILED DESCRIPTION OF THE PREFERRED EMBODIMENT

For a better understanding by one skilled in the art, the present invention is further described with the following drawings and preferred embodiment.

The present invention provides a fossil-fuel power generation system assisted by waste incineration, comprising a waste incineration subsystem and a fossil-fuel power generation subsystem.

Figure 1:
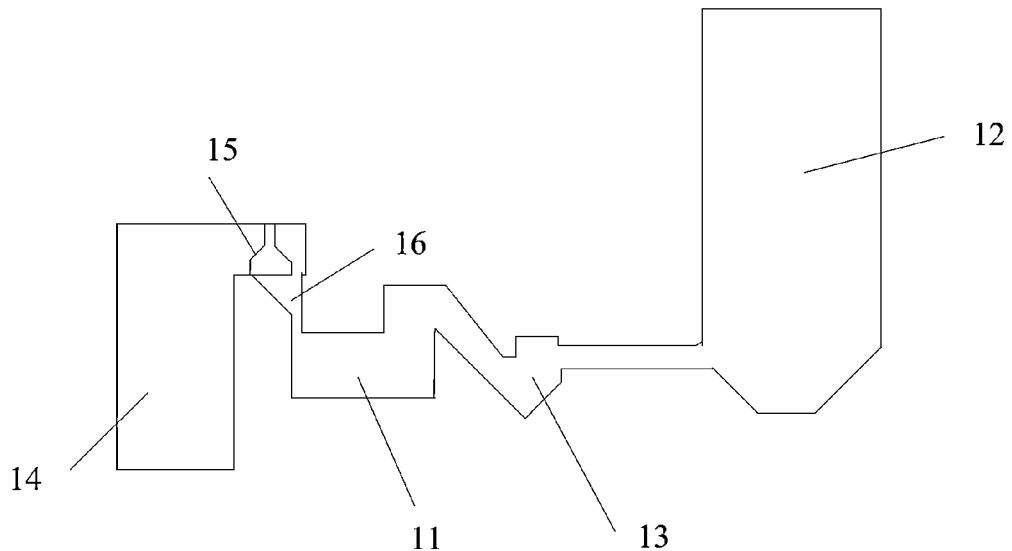
FIG. 1 is a sketch view of a fossil-fuel power generation system assisted by waste incineration according to a preferred embodiment of the present invention.
Figure 2:
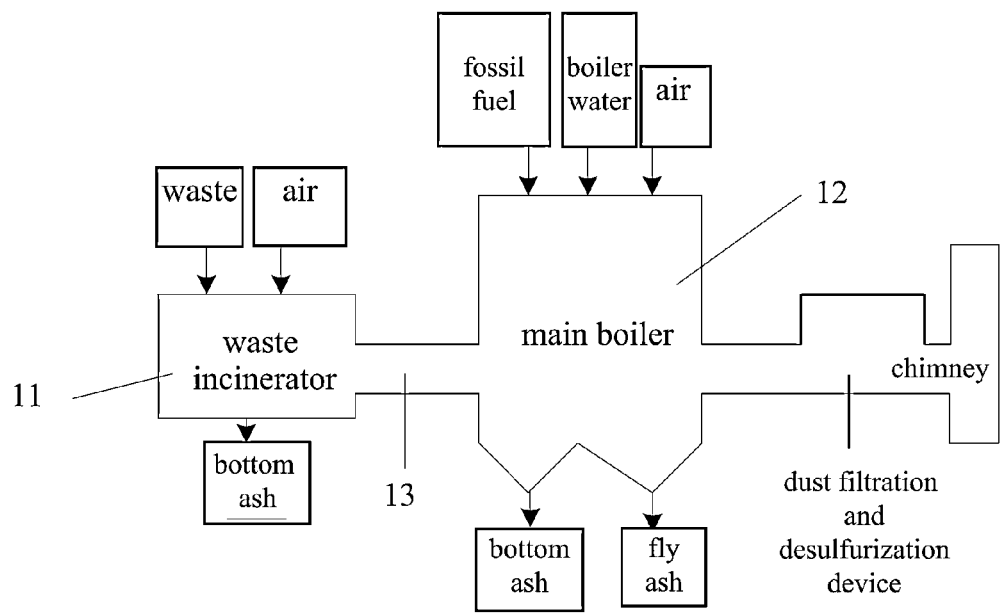
FIG. 2 is a sketch view of a processing flow of the fossil-fuel power generation system assisted by waste incineration according to the preferred embodiment of the present invention.

Referring to FIG. 1 and FIG. 2 of the drawings, according to a preferred embodiment of the present invention, the waste incineration subsystem comprises a waste incinerator 11 and the fossil-fuel power generation subsystem comprises a main boiler 12; wherein:

a flue gas channel 13 is provided between a furnace of the waste incinerator 11 and the main boiler 12; flue gas generated by waste incineration of the waste incinerator enters the main boiler 12 through the flue gas channel 13. The flue gas channel 13 is preferred to be short.

The flue gas channel 13 is located in a low part of the main boiler 12; preferably, the flue gas channel is located below a first combustion zone of the main boiler.

When the main boiler 12 is a coal-fired boiler, in order to prevent depositing soot, a running speed of the flue gas is required to be more than 20 m/s; when the main boiler 12 is an oil-fired boiler or a gas boiler, the running speed of the flue gas is set relatively low, for minimizing soot particles which enter the main boiler. Otherwise, corresponding dust removal and collection equipments are required to be installed.

The flue gas channel 13 connecting the waste incinerator and the main boiler of the power plant is located below the first combustion zone of the main boiler, for ensuring a highest combustion temperature of an entire combustion chamber of the main boiler from beginning to end. The flue gas from the assistant waste incinerator runs throughout the high-temperature combustion zone, wherein the flue gas is heated to 1400-1500° C. to ensure that harmful substances contained in the flue gas, such as cyanogen chloride and furan, are burned down.

The entire flue gas channel 13 from the furnace of the waste incinerator 11 to an interface of the main boiler is adjusted according to an actual situation, wherein the flue gas channel is generally lined with fire-resistant insulation materials and comprises a channel wall strengthening support, a docking framework, a fixed pillar, a slideway, a checking inlet and an interface to the main boiler. Ash hoppers for cleaning flying ash are provided with vertical parts of the flue gas channel. Each part of the channel wall of the flue gas channel is a structural layer at least 6 mm. In the flue gas channel, a flying ash cleaning mechanism is further provided, comprising ash hopper fasteners, an impeller gate, a sliding plate gate switch and a sliding slot, wherein the ash hopper fasteners are located below the ash hoppers, 500*500 mm; and wherein the impeller gate is located below the ash hoppers with a hinge-brake driving motor and corresponding brackets.

Additionally, a connection between an operation of the waste incinerator 11 and a program regulation management of the power plant also needs to be realized.

The connection between the assistant waste incinerator and the program regulation management of the main boiler of the power plant is very important. Accordingly, relevant data about thermal energy from the waste incinerator into the combustion chamber of the main boiler are determined firstly, wherein limiting restriction values comprise excessive air, a maximum allowable temperature of the flue gas generated by the waste incineration, a necessary air temperature for reaching a required heat value when combusting, and a load operation plan of the power plant.

A synchronous operation of the main boiler and the assistant waste incinerator of the power plant is realized in an automatic control manner, wherein all important data, such as an amount of combustible waste, an amount of fossil fuel, a temperature and a pressure relationship, need to be recorded, analyzed and adjusted automatically.

Firstly, it is necessary to maintain a constant amount of waste disposal; then, according to a thermal energy amount of the flue gas generated by the waste incineration, corresponding reductions in a combustion intensity of the main boiler and in the number of fuel nozzles and gas nozzles are determined, so as to keep a total thermal energy for a power generation process unchanged and merely replace a part of the original fossil fuel with the combustible waste.

To control a power of the furnace aims at optimizing the combustion intensity, ensuring a completion of a designed target and guaranteeing an uptime as long as possible; avoiding corrosion or caking of the waste within the furnace; minimizing a radioactive contamination caused by combustion and so on. For controlling the whole combustion process effectively, the furnace and a grate system must be adjusted to adapt to special requirements of the combustible waste. By adjusting the power of the furnace, a fluctuation of the combustion intensity unavoidably caused by special mixed combustible waste is balanced effectively. Moreover, high-quality linings of the furnace and the flue gas channel also play an important role in heat storage and have a positive impact for balancing an unstable heat value of the combustible waste.

An air adjustment in the furnace starts from a constant inputting amount of the combustible waste and is finished by adjusting amounts of primary ventilation and secondary ventilation. A furnace temperature can be used as a standard parameter for ensuring a constant discharging temperature of an outlet of the combustion chamber.

Furthermore, a total amount of the primary ventilation and the secondary ventilation can be set as a constant. A primary ventilation index is set once according to requirements of each grate section; even if the waste in the furnace causes an actual change of the primary ventilation amount, it is still unnecessary to change originally set proportion.

A feeding frequency is preset according to an estimated intermediate heat value and then is adjusted manually according to an actual calculated heat value, until reaching an optimization result.

By a specialized on-off procedure, the assistant waste incinerator is put into operation or out of operation at any time, without any negative impact on an overall plan of the power plant. Because the waste incinerator sharing a partial load is easily put into use, the waste incinerator is competent for any operation plan matching with the overall plan of the power plant.

In the preferred embodiment of the present invention, the waste incineration subsystem further comprises a storage chamber 14, an inputting mechanism and a feeding mechanism 15.

Sealed containers containing the combustible waste are sent to the power plant and then are directly unloaded next to a proposed waste incineration equipment plant. Considering mid-term transition storage and short-term storage of the waste, which easily freezes in winter, enough space need be left.

When unloading, the containers are lifted up to an unloading platform by a crane and sent to an inlet of the storage chamber along a rail track; then the waste is pushed out from the containers by a hydraulic device and directly injected into the storage chamber 14.

The storage chamber 14 is a buffer zone before the waste incinerator and is for balancing combustible waste storage. In addition, ingredients of the waste, which may freeze in bad winter weather conditions, are handled appropriately in the storage chamber; and air in the storage chamber 14 is uninterruptedly exhausted and changed, for avoiding generation and accumulation of bad smells.

Detailedly, the inputting mechanism comprises a hopper 16, a wings flap, a flap box and an inputting channel leading to the furnace; the hopper has a steel-plate structure and hangs at an outlet of the storage chamber; the wings flap, for preventing air from entering the furnace of the waste incinerator when the hopper is short of waste, comprises a hollow shaft, a bearing neck, a transmission lever, a radial joint coupler and a hydraulic cylinder; the flap box contains the wings flap, and connects the hopper and the inputting channel; the inputting channel has an inlet sleeved with the flap box and an outlet connected with the furnace; the inputting channel further comprises a water injection connection sleeve and a drainage connection sleeve.

Feeding the hopper of the waste incinerator is executed by a grab crane. The hopper 16 is a support structure with steel plates and has a holder in an elastic sound-absorbing structure; the hopper 16 has a discharging port covered with wear resistant plates which are replaceable at any time; a front plate wall of the hopper 16 tilts 36°; two sidewalls and a back plate wall of the hopper 16 are all vertical, which not only facilitates feeding the hopper 16 but also avoids a 'bridging' phenomenon before the waste slides down.

The feeding mechanism 15 is a mechanical non-stop feeding mechanism, comprising two pounder-type feeding push-rods with a hydraulic synchronous movement, a connecting rod and a universal joint, a sliding plate and a sealing panel, a feeding rail made of steel plates and steel brackets, a beam located above an inlet of the furnace and a coaming with a protective lining. The inputting channel is water-cooled and inclines downward, which avoids a feeding blockage; two hydraulic pounders, provided in a bottom half of the inputting channel, evenly distribute the waste onto a grate. The feeding manner is designed as evenly distributing raw materials of the waste onto a combusting waste layer to ensure that the raw materials are ignited quickly and effectively.

Preferably, the inputting mechanism further comprises a compensator which is located between the flap box and the inputting channel.

The waste incinerator has a pushing-type grate structure and comprises the grate, a holder for the grate, a power device and a grate driving component.

The grate, located below the furnace, comprises orderly arranged movable grate strips and fixed grate strips, wherein a row of the fixed grate strips and a row of the movable grate strips are staggered successively.

The holder for the grate is located below the grate, for supporting the movable grate strips and the fixed grate strips.

The power device for supplying hydraulic power for the whole waste incinerator comprises a hydraulic unit, a reversing valve, a relief valve, a pressure gauge, a pressure switch and an oil tank.

The grate driving component comprises a plurality of driving motors and corresponding connection pipelines.

The waste incinerator is embodied as a section-pushing-type grate whose pushing-type combustion is designed specially for the waste incineration. The whole grate tilts 12.5° inwardly and is longitudinally divided into two parallel sections which are further respectively divided into four small sections, wherein each small section independently operates and adjusts a ventilation control without any mutual interference. The section-pushing-type grate is further provided with two cooling slopes for preventing the waste from sintering into chunks.

The grate comprises the orderly arranged grate strips, which are similar to root tiles; an arrangement of the grate strips is that a row of the fixed grate strips follows a row of the movable grate strips, and that the fixed grate strips and the movable grate strips are staggered successively. Under a working state of a high-temperature combustion, about 2% of a total area of the movable grate strips play a role of ventilation, which ensures an even ventilation in the furnace. The running speed of the flue gas between pores of the movable grate strips is only 10-15 m/s, so there is not so much leakage of solid materials.

The grate strips not only prevent foreign matter deposition between the grate strips, but also continuously self-clean during pushing back and forth by the grate.

Preferably, the furnace of the waste incinerator of the waste incineration subsystem comprises interfaces corresponding to other structural equipments. The furnace is lined with high-quality fire-resistant materials, wherein a body shell is a St 37-2 steel welded shell having reinforced supports made of section steels, a furnace lining of insulation material and a furnace roof made of light-weighted fire-resistant bricks. The furnace is specially designed for incinerating the waste, wherein a central combustion is formed within. The furnace is relatively spacious to ensure a maximum thermal energy release of the combustible waste and a relatively small thermal stress onto furnace walls, which relatively extends a high-temperature staying time of the combustible waste in the furnace, guarantees a full combustion of carbides and reduces a discharge of solid particulars.

In addition, in order to realize a good connection with fossil-fuel power generation and a full combustion, the ventilation amount of the furnace of the waste incinerator is controlled. Thus, a furnace ventilation system is provided, wherein the ventilation system is divided into the primary ventilation and the secondary ventilation. The primary ventilation refers to primary air for cooling, which enters the furnace through the pores between the movable grate strips, and the secondary ventilation refers to secondary air introduced above the grate. A relationship between the primary ventilation and the secondary ventilation is determined by an actual combustion condition (level of the heat value). The ventilation control guarantees the full combustion of the waste in the furnace and ensures that a temperature of the flue gas at an outlet of the waste incinerator reaches 900-1000° C. A total ventilation amount of the waste incinerator is adjusted and controlled uniformly by a furnace power control device of the main boiler of the power plant.

Figure 3:
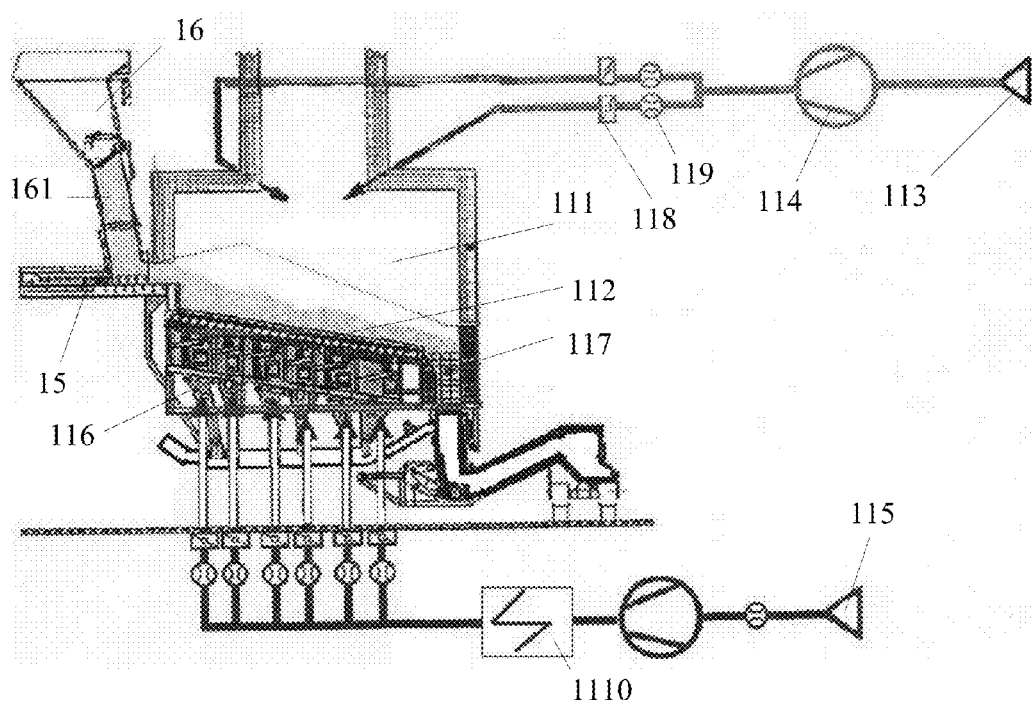
FIG. 3 is a sketch view of a waste incinerator according to the preferred embodiment of the present invention.

In the preferred embodiment of the present invention, a detailed structure of the waste incinerator is showed in FIG. 3. The combustible waste runs through the hopper 16 and a waste slot 161, and then enters the furnace 111 by a continued promotion of the feeding mechanism 15. The sidewalls and the roof of the furnace 111 are made of the fire-resistant bricks. A plurality of the grate strips 112 is located at the bottom of the furnace. The ash generated by combustion falls into an ash slot through the ash hoppers 116; slags also fall into the ash slot through a slag slot 117 and are sent along with the ash into a slag discharging and soot cleaning equipment. The secondary ventilation enters the furnace 111 through a secondary airflow inlet 113, a blower 114, a flow velocity meter 119 and a control valve 118. The primary ventilation runs through a main airflow inlet 115, the blower and a preheating mechanism 1110 to be formed into a ram airflow which then enters the furnace 111.

The furnace ventilation system comprises:

a primary ventilation fan which is a low-noise vortex guiding ventilation system, comprising a steel-plate welded shell, a solid vortex regulator, a rotary motor, and accessories which comprise a fan and a motor base, wherein the motor base comprises a first damper; a first muffler is mounted within a suction pipeline; and compensators are equipped with a suction side and a high-pressure side;

a driving motor which is a direct squirrel-cage rotor motor;

a secondary ventilation fan which has the same structure, accessories and parts with the primary ventilation fan;

a primary ventilation pipeline, comprising the suction pipeline and a high-pressure pipeline which are steel-plate structures strengthened by section-steel, and further comprising longitudinally welded steel pipelines; wherein the suction pipeline is further provided with a protection fence, a compensator, fixed components and measuring segments; and a secondary ventilation pipeline which is the same with the primary ventilation pipeline.

A ventilation shunt pipeline, which is a ventilation shunt pipeline system for the grate combustion zone, comprises: a) a primary ventilation shunt pipeline, comprising longitudinal ventilation air ducts at two sides of the waste incinerator and bottom air ducts for sending air to each section at the bottom of the grate, wherein the primary ventilation shunt pipeline is provided with a flow adjustment gate with a corresponding braking motor; b) a secondary ventilation shunt pipeline, comprising air ducts for horizontally sending air to a front and a back shelter walls of the combustion chamber; and c) a secondary ventilation flow adjustment gate, a braking motor and a nozzle which corresponds to the secondary ventilation flow adjustment gate.

Preferably, in the preferred embodiment of the present invention, the waste incinerator further comprises a cooling mechanism. The cooling mechanism has a peripheral protective sleeve and is mounted on the sidewalls of the whole combustion zone of the furnace.

Preferably, in the preferred embodiment of the present invention, to start an ignition of the waste incinerator and balance a combustion quality, two sets of high-quality ignition and combustion burners are symmetrically mounted on the two sidewalls of the furnace, a combustion power thereof reaches 60% of the whole waste incinerator thermal power, which is sufficient to ensure a smooth ignition of the waste incinerator at a short time.

The burners are gas burners and a power of the gas burners reaches about 60% of a designed total thermal power of the waste incinerator. The two sets of burners comprise:

two sets of double-jointed burners, wherein each set of the double-jointed burner comprises a burner sleeved shell, a lock control mechanism for combustion air, ignition accessories and parts, gas accessories and parts, a connection pipeline from a gas distribution station to the burner, a gas electric ignition mechanism, a muffler cover, a plurality of fuel parts comprising a pipeline, a connection rod and a duplex regulator, a rapid cutout valve and a manual shut-off valve;

two combustible air blowers, wherein each combustible air blower comprises a second damper, a second driving motor, a second suction pipeline, a second muffler, a second noise insulation cover, a second noise insulation plate and an air duct connecting the blower and the burner;

an air-cooler, comprising a third damper, a third driving motor, a third suction pipeline, a third muffler, a third noise insulation cover, a third noise insulation plate and a cooling air duct connecting the air-cooler and the burner; and a control-operation system, comprising an electric cabinet (including a full set of accessories, parts, switching buttons, indicating lights, inputting terminals etc.), a burner live console, an automatic combustion monitor (with a flame control relay) and a mounting base of the burners.

Preferably, the waste incinerator further comprises a slag discharging and soot cleaning equipment.

Most of remaining inert substances (about 90%) after being incinerated by the waste incinerator become chunk-shaped slags at the bottom of the grate, and the rest of the remaining inert substances becomes fine ash which runs through the grate and falls onto the bottom of the waste incinerator, wherein the fine ash is usually sent with other slags into a slag removal machine to be processed. At an end of the grate, combusted residues run through a fully-closed down-sliding path and enter a pounder-type wetting slag removal machine which is connected to the fully-closed down-sliding path; then the combusted residues are cooled by a sealed cleaning pool of the slag removal machine, wherein a water level of the cleaning pool remains constant to ensure no methane gas leakage within a slag discharging channel.

The slags discharged by the slag removal machine are sent to a buffer grinding machine through a conveyor belt. The slags are ground and crushed before being sent to large slag heaps of the power plant to be treated uniformly, such as to be directly used for road construction. Magnets hang above the conveyor belt respectively before and after the buffer grinding machine for attracting metal particles from the slags.

The fine ash falling into the bottom of the waste incinerator is collected into a slot conveyor belt by the ash hoppers which are set below each section of the grate, and directly sent to the slag removal machine. Because the slot conveyor belt works underwater and the ash hoppers also directly invade the water to send the ash to the conveyor belt, a gas seal is ensured. In fact, the fine ash at the bottom of the waste incinerator can be directly transported to the large slag heaps of the power plant, which is an alternative plan.

In detail, in the preferred embodiment of the present invention, the slag discharging and soot cleaning equipment comprises the ash hoppers, scraping-rake-type transporters, the ash hopper fasteners and a sliding slot.

The ash hoppers for collecting fallen ash are located at the bottom of the grate; the scraping-rake-type transporters are for cleaning the fallen ash in the ash hoppers by wetting; the ash hopper fasteners for closing discharging outlets of the ash hoppers are located below the ash hoppers; and the sliding slot connects the ash hoppers and the scraping-rake-type transporters.

Preferably, the slag discharging and soot cleaning system, for cleaning accumulated slags at the end of the combustion grate and collecting the fallen ash at the bottom of the grate, comprises:

two sets of scraping-rake-type transporters for cleaning by wetting the fallen ash which is collected by the ash hoppers mounted at the bottom of the grate, wherein an abovewater part of a transport slot is 500 mm wide and the transport slot is made of 5 mm steel plates and comprises all accessories and parts;

the ash hopper fasteners for closing the discharging outlets of the ash hopper, which are opened and closed by a hand wheel;

the sliding slot, which connects the ash hoppers and the scraping-rake-type transporters; and an SEM-2004 pounder-type slag removal machine for cleaning the accumulated slags at the end of the grate in the combustion zone, comprising a slag slot, which is a structure reinforced by steel plates and section steel and provided with corresponding docking frameworks, slag channels, upper and lower pipeline interfaces, wherein steel plates for a slot bottom and slot walls, which are easy to wear, can be renewed regularly; a vibration-type pounder, which is welded by steel plates; a hydraulic pump set comprising a pressure limiting valve, adjusted and operated uniformly with waste incinerator power; connection sleeves in the slag removal machine, which is a structure reinforced by 8 mm steel plates and section steel; and a connection framework and a control gate.

An exhaust gas discharging device of the combustion furnace comprises sleeves for connecting with the ventilation system of the combustion chamber.

The fossil-fuel power generation system assisted by waste incineration of the present invention further comprises a slag processing system which comprises:

the slag conveyor belt for sending the slags to the grinding machine to be processed, wherein the magnet for attracting the metal particles from the slags hangs above an end of the conveyor belt;

four bulk containers for collecting metal materials after a purification process;

the buffer grinding machine, which grinds the slags into particles which are suitable for road construction;

an oscillating conveyor groove, wherein a magnet specially for attracting the metal particles hangs on an end of the oscillating conveyor groove; and a transport conveyor belt, which sends processed slags to the large slag heaps of the power plant to be processed uniformly.

Preferably, the exhaust gas discharged by the main boiler after a secondary combustion is processed with a dust filtering treatment, a desulfurization treatment and so on.

Additionally, in waste transportation phase, solid waste, which cannot be corrupted, cannot be directly sent to the power plants from residential areas; garbage trucks transport the combustible waste regularly to a fixed distribution center for extrusion and package, which is prepared for a next transportation. The waste is usually sent to the power plants by road or railway transportation with fully enclosed trucks.

If containers are chosen for the transportation, the power plants need to have a crane device at least and further have an extrusion device to ensure smoothly unloading the containers and feeding the storage chamber. If the waste is extruded and bundled waste packages, a cutting device need be provided to open the packages.

Because the fossil-fuel power generation system assisted by waste incineration, provided by the present invention, makes a full use of existing infrastructures, power generation equipments, smoke and dust environmental treatment technologies, investment costs of the fossil-fuel power generation system assisted by waste incineration, decreased by more than 50% compared with a conventional waste incineration facility of the same scale.

Next, the assistant waste incinerator provides the main boiler of the power plant thermal energy, which is about 20% of the combustion power of the main boiler. A combustion temperature of the assistant waste incinerator is about 800° C. and a combustion temperature of the main boilers, which use original fossil fuels, such as coal, oil and natural gas, as main energy, is over 1400° C. After the primary and the secondary incineration, harmful substances in the present invention such as chlorine and fluorine of the waste are guaranteed to be burned down safely.

Finally, the thermal energy from the waste generated by the assistant waste incinerator is incorporated into the main boiler of the power plant for a high-efficiency energy conversion utilization. A thermal energy-conversion utilization efficiency of the fossil-fuel power generation system of the present invention reaches 40%, which is nearly three times higher than a conventional waste incineration facility.

Meanwhile, replacing the original fossil fuels with the renewable composite waste realizes a high-efficiency waste thermal energy-conversion utilization efficiency; and replacing the original fossil fuels, such as coal, oil and natural gas, with the renewable waste reduces a carbon dioxide pollution to air space, so as to generate a positive impact on greenhouse effect.

The assistant waste incinerator is established within a limited area of existing industrial power plants and generates power by using waste thermal power, which saves a large area of landfills, relieves a long-time pollution problem caused by a wastewater leakage of the landfills and waste methane, helps solve a landfill pollution problem and protects a living environment of human beings.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fossil-fuel power generation system assisted by waste incineration, comprising a waste incineration subsystem and a fossil-fuel power generation subsystem; wherein:
    said waste incineration subsystem comprises a waste incinerator and said fossil-fuel power generation subsystem comprises a main boiler;
    a flue gas channel is provided between a furnace of said waste incinerator and said main boiler; and said waste incinerator incinerates waste and generates flue gas which enters said main boiler through said flue gas channel; and
    said flue gas channel is lined with fire-resistant materials;
    the fossil-fuel power generation system further comprises a control device, wherein: said control device comprises a switch component for controlling said waste incineration subsystem to enter or withdraw from said fossil-fuel power generation subsystem in real time; and said control device is further for controlling a feeding frequency and a total ventilation amount of said waste incineration subsystem;
    said waste incineration subsystem further comprises a storage chamber, an inputting mechanism and a feeding mechanism, wherein:
    said storage chamber is for sending the waste to said furnace;
    said inputting mechanism comprises a hopper, a wings flap, a flap box and an inputting channel leading to said furnace, wherein:
    said hopper has a steel-plate structure and hangs at an outlet of said storage chamber;
    said wings flap, for preventing air from entering said furnace of said waste incinerator when said hopper is short of waste, comprises a hollow shaft, a bearing neck, a transmission lever, a radial joint coupler and a hydraulic cylinder;
    said flap box contains said wings flap, and connects said hopper and said inputting channel; and
    said inputting channel has an inlet sleeved with said flap box and an outlet connected with said furnace; said inputting channel is further provided with a water injection connection sleeve and a drainage connection sleeve; and
    said feeding mechanism is a mechanical non-stop feeding mechanism, comprising two pounder-type feeding push-rods with a hydraulic synchronous movement, a connecting rod, a universal joint, a sliding plate, a sealing panel, a feeding rail made of steel plates and steel brackets, a beam located above an inlet of said furnace and a coaming with a protective lining.

2. The fossil-fuel power generation system assisted by waste incineration, as recited in claim 1, wherein said inputting mechanism further comprises a compensator which is located between said flap box and said inputting channel.

3. The fossil-fuel power generation system assisted by waste incineration, as recited in claim 1, wherein said waste incinerator has a pushing-type grate structure, comprising a grate, a holder for said grate, a power device and a grate driving component; wherein:
    said grate, located below said furnace, comprises orderly arranged movable grate strips and fixed grate strips, wherein a row of said fixed grate strips and a row of said movable grate strips are staggered successively;
    said holder for said grate is located below said grate for supporting said movable grate strips and said fixed grate strips;
    said power device, for supplying hydraulic power for said whole waste incinerator, comprises a hydraulic unit, a reversing valve, a relief valve, a pressure gauge, a pressure switch and an oil tank; and
    said grate driving component comprises a plurality of driving motors and corresponding connection pipelines.

4. The fossil-fuel power generation system assisted by waste incineration, as recited in claim 3, wherein said waste incinerator further comprises a cooling mechanism which has a peripheral protective sleeve and is mounted on a sidewall of a whole combustion zone of said furnace.

5. The fossil-fuel power generation system assisted by waste incineration, as recited in claim 3, wherein said waste incinerator further comprises two sets of ignition and combustion burners which are symmetrically mounted on two sidewalls of said furnace.

6. The fossil-fuel power generation system assisted by waste incineration, as recited in claim 3, wherein said waste incinerator further comprises a slag discharging and soot cleaning equipment which comprises an ash hopper, a scraping-rake-type transporter, an ash hopper fastener and a sliding slot; wherein:

said ash hopper for collecting fallen ash is located at a bottom of said grate;

said scraping-rake-type transporter is for cleaning said fallen ash in said ash hopper by wetting;

said ash hopper fastener for closing a discharging outlet of said ash hopper is located below said ash hopper; and said sliding slot connects said ash hopper and said scraping-rake-type transporter.

\* \* \* \* \*